United States Patent
Stevens

(10) Patent No.: US 7,130,423 B2
(45) Date of Patent: Oct. 31, 2006

(54) THRESHOLD ENCODING OF FRAME BUFFERS

(75) Inventor: Michael T. Stevens, Aloha, OR (US)

(73) Assignee: Xerox Corporation, Stamford, CT (US)

( * ) Notice: Subject to any disclaimer, the term of this patent is extended or adjusted under 35 U.S.C. 154(b) by 944 days.

(21) Appl. No.: 10/160,833

(22) Filed: May 31, 2002

(65) Prior Publication Data

US 2003/0223578 A1 Dec. 4, 2003

(51) Int. Cl.
- H04K 1/00 (2006.01)
- H04L 9/00 (2006.01)
- H04N 7/167 (2006.01)
- H04K 1/04 (2006.01)
- G09G 5/02 (2006.01)
- G06K 9/36 (2006.01)
- G06K 9/40 (2006.01)

(52) U.S. Cl. .................. 380/28; 380/217; 380/44; 380/37; 345/596; 382/232; 382/254

(58) Field of Classification Search .......... 380/28, 380/44; 382/232, 254
See application file for complete search history.

(56) References Cited

U.S. PATENT DOCUMENTS

| | | | |
|---|---|---|---|
| 6,198,508 B1 * | 3/2001 | Jang et al. | 348/391.1 |
| 6,201,614 B1 * | 3/2001 | Lin | 358/3.13 |
| 6,505,299 B1 * | 1/2003 | Zeng et al. | 713/160 |
| 6,891,951 B1 * | 5/2005 | Inoha et al. | 380/44 |

\* cited by examiner

Primary Examiner—Christopher Revak
Assistant Examiner—Trang Doan
(74) Attorney, Agent, or Firm—Oliff & Berridge, PLC

(57) ABSTRACT

A method for encoding and decoding frames by generating a key bitstream such that the key bitstream never has to be stored is disclosed. The method consists of a key generation algorithm using a threshold matrix to generate a key that is very similar to original bitmap data. The key generation algorithm searches the bitmap for equivalent image sets that produce the same bitmaps. These equivalent image sets consist of runlength of constant image values and the actual runlength. Additionally, the image values for the runlengths are never explicitly encoded. During compression a preprocess algorithm XORs the MINIMAL number of hints required to find a equivalent image value for the runlength. The postprocess algorithm is capable of distinguishing if a single bit represents an image value adjustment hint or if it represents the end of a runlength. By allowing the image value for each run length to be represented by a series of hints it is possible to avoid specifying the image value with an excessive amount of precession. Excessive precision of the image value simply adds data to the data stream without adding any additional information.

23 Claims, 9 Drawing Sheets

```
54                                                                                          56
 ↳IMAGE DATA SET #1  52 56 47 50 51 53 52 55 54 59 57 60 56 57 57 59 64 60 61
   IMAGE DATA SET #2  51 51 51 51 51 51 51 51 51 51 51 51 51 70 70 70 70 70 70
 ↳THRESHOLD VALUES   10 82 59 32 99 50 53 78 23 91 62 66 02 54 39 72 49 17 80
   RESULTING BITMAP   0  1  1  0  1  0  1  1  0  1  1  1  0  0  0  1  0  0  1
 50                                                                                         24
```

FIG. 9

| THRESHOLD VALUES | 10 | 82 | 59 | 32 | 99 | 50 | 53 | 78 | 23 | 91 | 62 | 66 | 02 | 54 | 39 | 72 | 49 | 17 | 80 |
|---|---|---|---|---|---|---|---|---|---|---|---|---|---|---|---|---|---|---|---|
| BITMAP DATA | 0 | 1 | 1 | 0 | 1 | 0 | 1 | 1 | 0 | 1 | 1 | 1 | 0 | 0 | 0 | 1 | 0 | 0 | 1 |
| MIN | 10 | 10 | 10 | 32 | 32 | 50 | 50 | 50 | 50 | 50 | 50 | 50 | 50 | 54 | 54 | 54 | 54 | 54 | 54 |
| MAX | 99 | 81 | 58 | 58 | 58 | 52 | 52 | 52 | 52 | 52 | 52 | 52 | 52 | 99 | 99 | 71 | 71 | 71 | 71 |
| RUNLENGTH | 1 | 2 | 3 | 4 | 5 | 6 | 7 | 8 | 9 | 10 | 11 | 12 | 13 | 1 | 2 | 3 | 4 | 5 | 6 |

FIG. 10

THRESHOLD ENCODING OF FRAME BUFFERS

In printing applications, such as solid ink jet and laser printers, it is often desirable to compress image data that has been dithered down to single bit per pixel per plane. This is often achieved by directly entropy encoding the bitmap. One such typical implementation for compression/decompression of bitmaps is shown in FIGS. 1 through 3 wherein the bitmap data 24 is processed through an LZW entropy encoder 20 resulting in compressed data 26. When needed the bitmap data is recreated by processing the compressed data 26 through the LZW decoder 22. For purposes of discussion only, all entropy encoders/decoders will be LZW algorithms, although any general-purpose entropy encoders/decoders may be used. The dithering process introduces entropy into the bitmap wherein the worst offenders are stochastic screens; their 'random' textures introduce huge amounts of entropy into the bitmap. This wreaks havoc with the performance of entropy encoders. In printer applications bitmaps are sometimes compressed so that they might fit into the available memory. If the bitmap data has a high amount of entropy it will not compress small enough to fit into existing memory. At this point the print system is forced to do something undesirable; it must discard some image data or not print the page at all. Discarding some image data is generally considered the lesser of the two evils.

Referring to FIG. 3, image or bitmap data 24 is discarded during the entropy removal stage 30. This data is not recovered after decompression. The resulting modified bitmap 28 is not identical to original. These types of compression schemes are referred to as lossy. The entropy removal step is a tricky proposition. It must remove entropy from the data stream and at the same time introduce as few image artifacts as possible. This is at best a difficult task when processing a 2-dimensional halftone image as a 1-dimensional bit stream. Lossy compression should be avoided if at all possible. Therefore what is needed is a general lossless technique for removing entropy from data streams. This will make a data stream more palatable to the entropy encoders, and will result in higher compression ratios. Higher compression ratios will result in a larger number of bitmaps that will compress losslessly, and will dramatically reduce the need for lossy compression. Overall image quality will improve due to the fact that fewer image artifacts are being introduced during compression.

SUMMARY OF THE INVENTION

In accordance with the present invention, a method is provided for generating a key bitstream so that the key bitstream never has to be stored. It can be created whenever needed. The method incorporates a key generation algorithm using a threshold matrix to generate a key that is very similar to original bitmap data. The key generation algorithm searches the bitmap for equivalent image sets that produce the same bitmaps. These equivalent image sets consist of runlength of constant image values and the actual runlength.

Additionally, the image values for the runlengths are never explicitly encoded. During compression a preprocess algorithm XORs the MINIMAL number of hints required to find a equivalent image value for the runlength. The postprocess algorithm is capable of distinguishing if a single bit represents an image value adjustment hint or if it represents the end of a runlength. This is extremely efficient because The equivalent image sets really represents a range of image values. By allowing the image value for each run length to be represented by a series of hints it is possible to avoid specifying the image value with an excessive amount of precession. Excessive precision of the image value simply adds data to the data stream without adding any additional information.

Still other aspects of the present invention will become apparent to those skilled in this art from the following description, wherein there is shown and described an embodiment of this invention by way of illustration of one of the modes best suited to carry out the invention. The invention is capable of other different embodiments and its details are capable of modifications in various, obvious aspects all without departing from the invention. Accordingly, the drawings and descriptions will be regarded as illustrative in nature and not as restrictive.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 9 is a tabular representation of an example of two images that produce the same bitmap;

FIG. 10 is a tabular representation of an example of converting a bitmap into a series of equivalent runlengths;

DETAILED DESCRIPTION OF THE INVENTION

Figure 1:
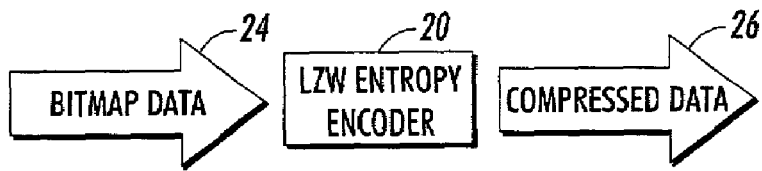
FIG. 1 is block diagram illustrating a typical implementation of LZW compression data flow.
Figure 2:
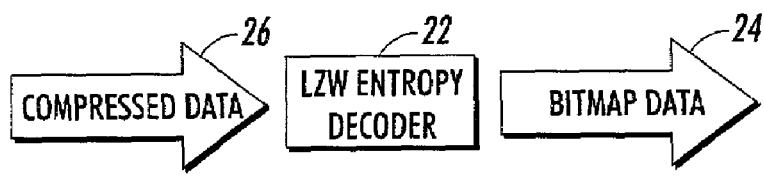
FIG. 2 is a block diagram illustrating data flow for a typical LZW decompression.
Figure 3:
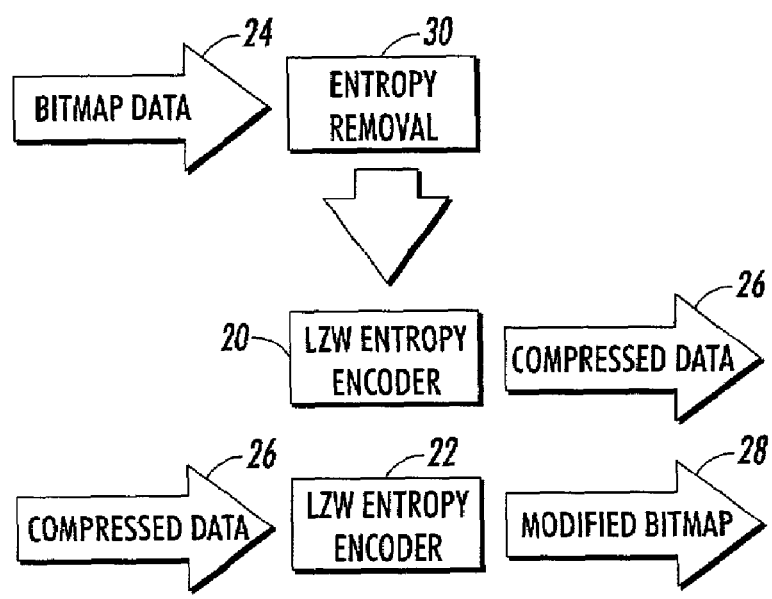
FIG. 3 is a block diagram illustrating the compression and decompression data flow for bitmap data in a typical lossy scheme.
Figure 4:
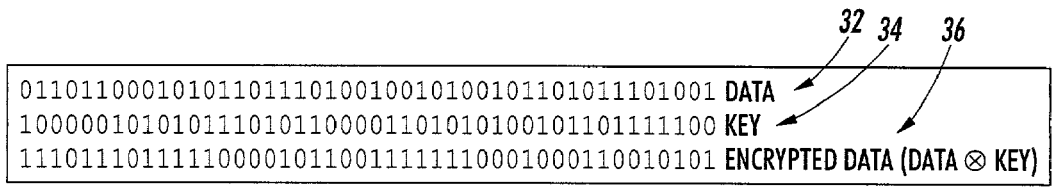
FIG. 4 is a tabular representation of single key encryption.
Figure 5:
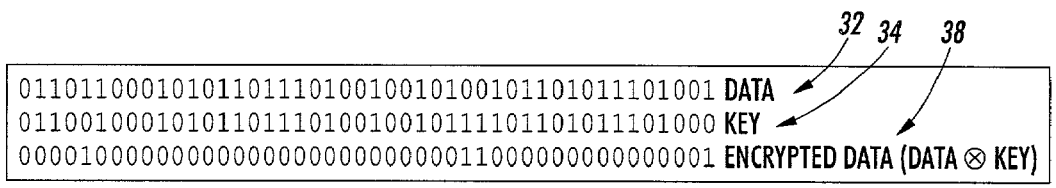
FIG. 5 is a tabular representation of single key encryption where the key and the data are nearly the same.

Referring to FIG. 4, there is shown a tabular representation of single key encryption. Single key encryption is known common secure way of transmitting data. Single key encryption takes the data 32 and in a bitwise fashion uses the XOR function with a key 34. The result is the encrypted data 36. The encrypted data 36 can then be transported to the recipient. If the recipient has the 'correct' key, the original data 32 can be recreated. Therefore, the encrypted data 36 with the key 34 are bitwise XORed to reconstruct the original data 32. Also, information privacy is not the only application for such processing. As shown in FIG. 5, if the data 32 and the key 34 are very similar, the encrypted data 38 contains many zeroes.

Figure 6:
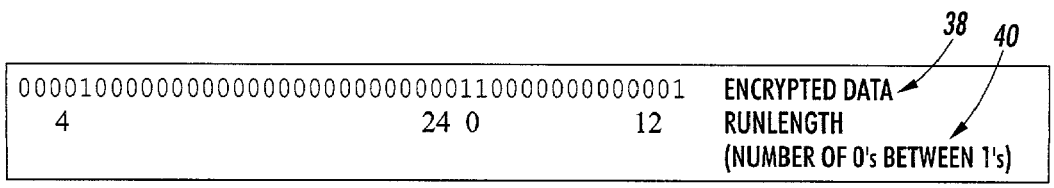
FIG. 6 is a tabular representation of a bitstream in terms of runlengths of zeroes.

A bit stream that contains many more 0s than 1s has a low entropy. Therefore it will compress into fewer bits than a bit stream with higher entropy. As long as the key used to encrypt the data is available during decompression, the original data can be recreated. This system becomes a lossless compression scheme. This low entropy data stream can be fed directly into an entropy encoder, but it is possible to further decrease the entropy of the data stream by reducing the total amount of data in the bit stream. FIG. 6 is a tabular representation of a low entropy data stream. The encrypted data stream 38 is run length 40 encoded. Each run length 40 represents the number of 0s between consecutive 1s.

Figure 7:
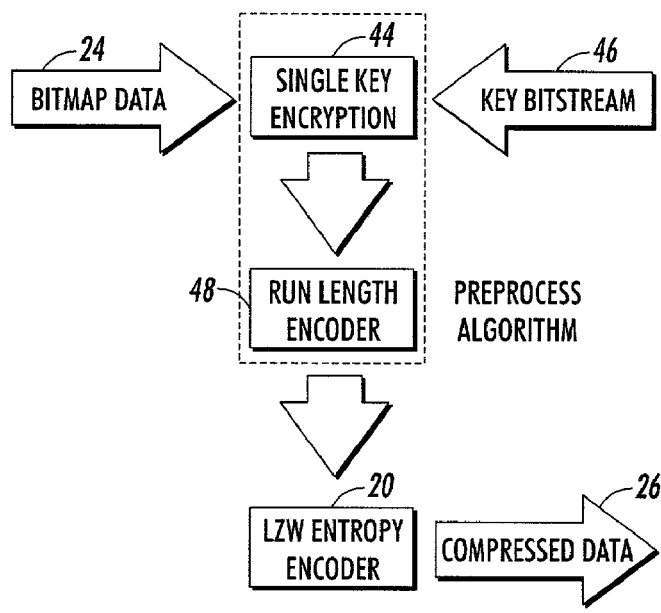
FIG. 7 is a block diagram illustrating data flow for general lossless entropy removal and data compression.

Referring now to FIG. 7, applying a single key encryption 44 and run length-encoding 48 on the bitmap data 24 will losslessly remove entropy from the data stream. This will result in higher compression 26 ratios achievable by the entropy encoder 20. This provides a general mechanism for improving the compression performance. However, there are two major problems that need to be noted at this point. It is necessary to find an appropriate key bitstream 46 for entropy removal, and the key needs to be stored in some fashion. It should be noted that neither of these tasks is trivial considering that the key may be as large as the original data.

In accordance with the present invention, an algorithm is used to generate a key bitstream so that the key bitstream never has to be stored. It can be created whenever needed. The identical key is needed for both the compression and the decompression phases. Therefore the key generation algorithm may only use data that is available during both phases.

All digital halftoning is the result of a set of rules. It is these rules that determine which pixels are marked and which are not. It will be assumed that all images are dithered via a threshold matrix and that threshold matrices work in the following way:

| Definition And Use Of Threshold Matrices |
| --- |
| All pixels P exists at integer coordinates (x, y). |
| For all pixel locations, there exists an integer threshold value T(x, y), such that Tmin < T(x, y) ≦ Tmax. Where Tmin and Tmax are constants. |
| For all pixel locations, there will also an integer image value G(x, y), such that Tmin ≦ G(x, y) ≦ Tmax. |
| If G(x, y) < T(x, y),then P(x, y) = 1 |
| If G(x, y) ≧ T(x, y),then P(x, y) = 0 |

The threshold values within the threshold matrix are known quantities. Knowing the threshold values and the way in which they are applied, provides the means for creating the algorithm of the present invention. This algorithm will produce a key that is "similar" to the bitmap data stream. Since the compression and decompression algorithms must generate the same key, only information that is common to both algorithms can be used. The threshold values and the encrypted data stream are both readily available during compression and decompression.

From the above definition of it is possible to make the following generalization about images:

$G(x1,y1) \approx G(x2,y2)$, when $x1 \approx x2$ and $y1 \approx y2$

In simple terms, pixels near each other tend to have the same image value. It would seem logical to try and exploit this fact in an image compression scheme. Unfortunately, the original image data is no longer available during decompression, and therefore can not be used in the key generation algorithm. Fortunately a far better data set is available. Halftoning is by definition a lossy process. This means that there are great many images that halftone to the same bitmap.

FIG. 9 is an example of two images that produce the same bitmap 24. As shown in FIG. 9 the two images contain radically different data, but in this application they are equivalent, because they result in the same bitmap 24. It is important to note that the first data set 54 is difficult to characterize. It has no obvious pattern. The second data set 56 can be easily described as: thirteen 51s, and six 70s. It is this property that makes the second data set 56 much more useful than the first data set 54. Furthermore, using the second data set 56 in lieu of the first data set 54 results in no loss of information, because they result in the same bitmap 24. By way of example it is assumed that an image has been dithered and the original image data has been lost. Therefore the problem is to find an equivalent data set that has the properties desired. More specifically, it is desirable to have large run lengths of constant values.

Referring to FIG. 10, the bitmap data 24 is processed like a bit stream. Each pixel and its matching threshold value 50 determine a range of image values that could have produced it.

If $P_n=1$, then $G<T_n$

If $P_n=0$, then $G \geq T_n$

Before any pixels are processed, G may have any value:

Min ≦ G ≦ Max, where:

Min=Tmin and Max=Tmax.

With each pixel processed, an additional constraint is added to G as follows:

If $P_n=1$, then

If Max ≧ $T_n$, then Max=$T_n$-1

If $P_n=0$, then

If Min < $T_n$, then Min=$T_n$

As pixels are processed, Min 58 and Max 60 converge. They will continue to converge until G "breaks" (Min>Max). This signals the end of a runlength 62, at which point Min 58 and Max 60 are reset to their initial values and the process begins anew. This algorithm produces runlengths of value G, where Min≦G≦Max. The value of G is not assigned a specific value, but rather a range of values. Each valid value of G represents an equivalent runlength. The entire range of G represents the entire set of equivalent runlengths of constant value.

Figure 11:
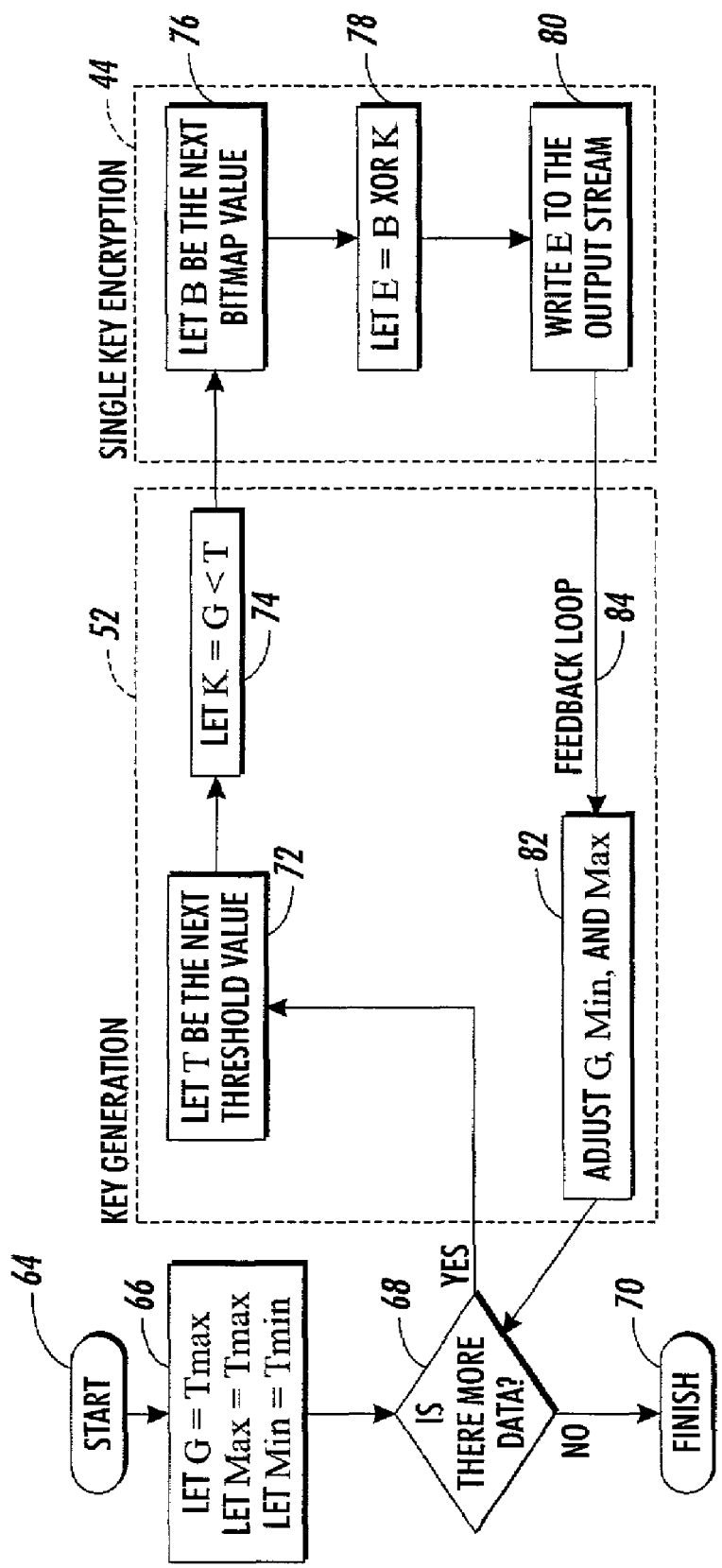
FIG. 11 is a low-level flowchart for a key generation and single key encryption modules.

Referring now to FIG. 11, with the afore-described abstract representation of the data, the key generation 52 algorithm begins to form. The key bitstream is generated by thresholding. The thresholding requires an image value as input. If it were possible to feed the key generator with an image set that was equivalent to that which was used to generate the bitmap, the encrypted bitstream would have no entropy. In order to reduce the entropy the key generation step merely needs to produce a key that is similar to the bitmap data. The "Adjust G, Min, and Max" step 82 is tightly related to the notion of equivalent data sets. It is assumed that the image data used to generate the bitmap consists of runlengths of a constant image value. This is a very safe assumption, because all images data sets have equivalent data sets that fit this requirement. As shown in FIG. 11, the data processing begins at step 64 wherein three integer variables are initialized in step 66 to assume that the image begins with a runlength of zeroes. As shown in step 66 let, G=Tmax, Max=Tmax, and Min=Tmin. In a typical 8 bit system Tmin=0, and Tmax=255. In a typical 12 bit system Tmin=0, and Tmax=4095. In a typical 16 bit system Tmin=0, and Tmax=65535. Next in step 68, a logic test is performed to see if all the data has been processed. If all the data has been processed the processing is complete in step 70 and finished.

If all the data has not been processed, then retrieve in step 72 the next threshold value out of the threshold matrix. The threshold array M is a two dimensional matrix of values that is indexed according to the current pixel position. If (x, y) is the current pixel position in the bitmap, then the threshold value for the current pixel is M[x modulo Nx, y modulo Ny], there Nx is the width of the threshold matrix and Ny is the height of the threshold matrix. Let T=M[x modulo Nx, y modulo Ny]. The next step 74 sets K=G<T, where K is a Boolean value with 0=false and 1=true. Then follows step 76 wherein the next bit is read out of the image bitstream assigning B the variable the value of that bit. The single key encryption 44 now sets E=B XOR K or more specifically the variable E is assigned the value of the exclusive-or between B and K as shown in step 78. The value of E is then written into the output stream in step 80. This output should feed into the runlength encoder. The "Adjust G, Min, and Max" step 82 is detailed in the description of FIG. 12. Step 82 requires feedback 84 from the single key encryption 44. Lastly, The value of E flows back 84 from the single key encryption step 44 into the key generation step 82.

Figure 12:
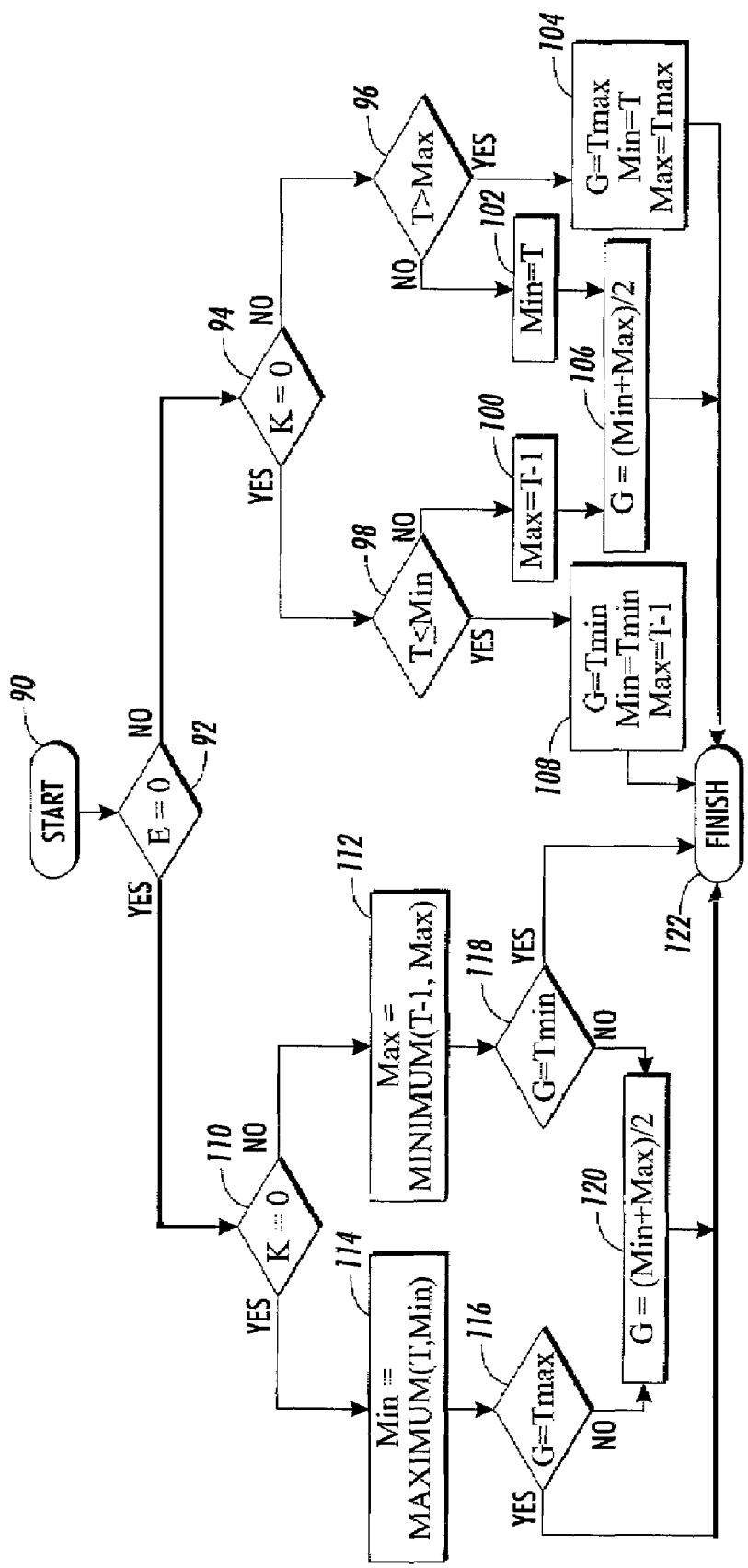
FIG. 12 is a flowchart showing specific details of the flowchart of FIG. 11.

Referring to FIG. 12 the processing begins at step 90. First in step 92 a test is performed to see if E=0. If not, then to step 94 wherein the test K=0 is performed. If K does not equal 0 the test T>Max is performed in step 96. If not then test if T≦Min in step 98. In step 100 decrease the maximum value of G, let Max=T−1. In step 102 increase the minimum value of G, let Min=T. Reaching step 104 indicates that the runlength has terminated. The values of G, Min, and Max are reset to begin a new runlength of zeroes. Let G=Tmax, Min=T, and Max=Tmax. In step 106 G is adjusted wherein G=(Min+Max)/2. G is an integer and is rounded to the lowest integer value. Reaching step 108 indicates that the runlength has terminated. The values of G, Min, and Max are reset to begin a new runlength of ones. Let G=Tmin, Min=Tmin, and Max=T−1. Step 110 is a Boolean test if K=0. In step 112 an additional constraint is applied to G, let Max=MINIMUM(T−1,Max). Where the function MINIMUM(a,b) returns the minimum value of a and b. In step 114 an additional constraint is applied to G, let Min=MAXIMUM(T,Min). Where the function MAXIMUM (a,b) returns the maximum value of a and b. Test in step 116 if a runlength of zeroes is being processed. If so, G will continue to have a value of Tmax. Next, test in step 118 if a runlength of ones is being processed. If so, G will continue to have a value of Tmin. G is adjusted in step 120 such that G=(Min+Max)/2. G is an integer and is rounded to the lowest integer value. The processing is complete in step 122.

G is the estimated value that will satisfy the condition Min≦G≦Max. Unfortunately, the actual values for Min and Max are not known until the runlength has been fully processed. As data is processed Min and Max converge. Effectively decreasing the set of all G that satisfy the "runlengths of constant image value" requirement. By way of example only, a safe estimation for G is: let G=(Min+Max)/2. Furthermore it is assumed that all runlengths are solid fills. If a runlength contains pixels that are both on and off, then it is known that the runlength is not a solid fill.

If E=0, then it is known that G was a successful estimation. If Min or Max change G is potentially recomputed. If E=1, then one of two events has occurred: the runlength has ended, or the estimation of G was poor. The relation of Min and Max to T provide the indication as to which event has just occurred. If Min≦T<Max, then the estimation of G was poor, otherwise the runlength has ended. When a new runlength begins; Min, Max, and G are reset.

Figure 15:
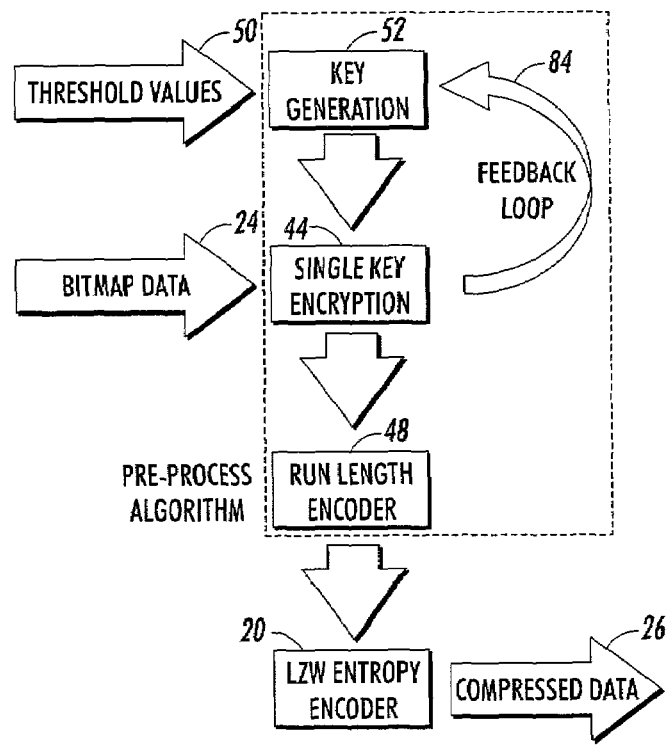
FIG. 15 is a block diagram of the data flow for halftone encryption data compression.

Referring to FIG. 15, the compression algorithm has been fully described inputting threshold values 50 and bitmap data 24 through an LZW entropy encoder 20 for compressed data 26. However, there is a significant amount of redundancy between the three parts namely the key generation 52, single key encryption 44 and run length encoder 48 of the pre-process algorithm. When all three stages are fitted together some interesting optimizations of the algorithm occur utilizing the feedback loop 84, but as a result of the optimization, the boundaries between the individual elements becomes lost. The preprocess algorithm becomes a single intertwined function.

In a mathematical sense the runlengths are unbounded. The runlengths may approach infinity. In the application of frame compression the runlength is bounded by the size of the frame buffer band that is being compressed. For ease of implementation it is assumed that all bands will contain less then $2^{32}$ pixels. This turns out to be a number in excess of 4 billion. For rendering performance reasons it is desirable to have bands much smaller than that.

Figure 13:
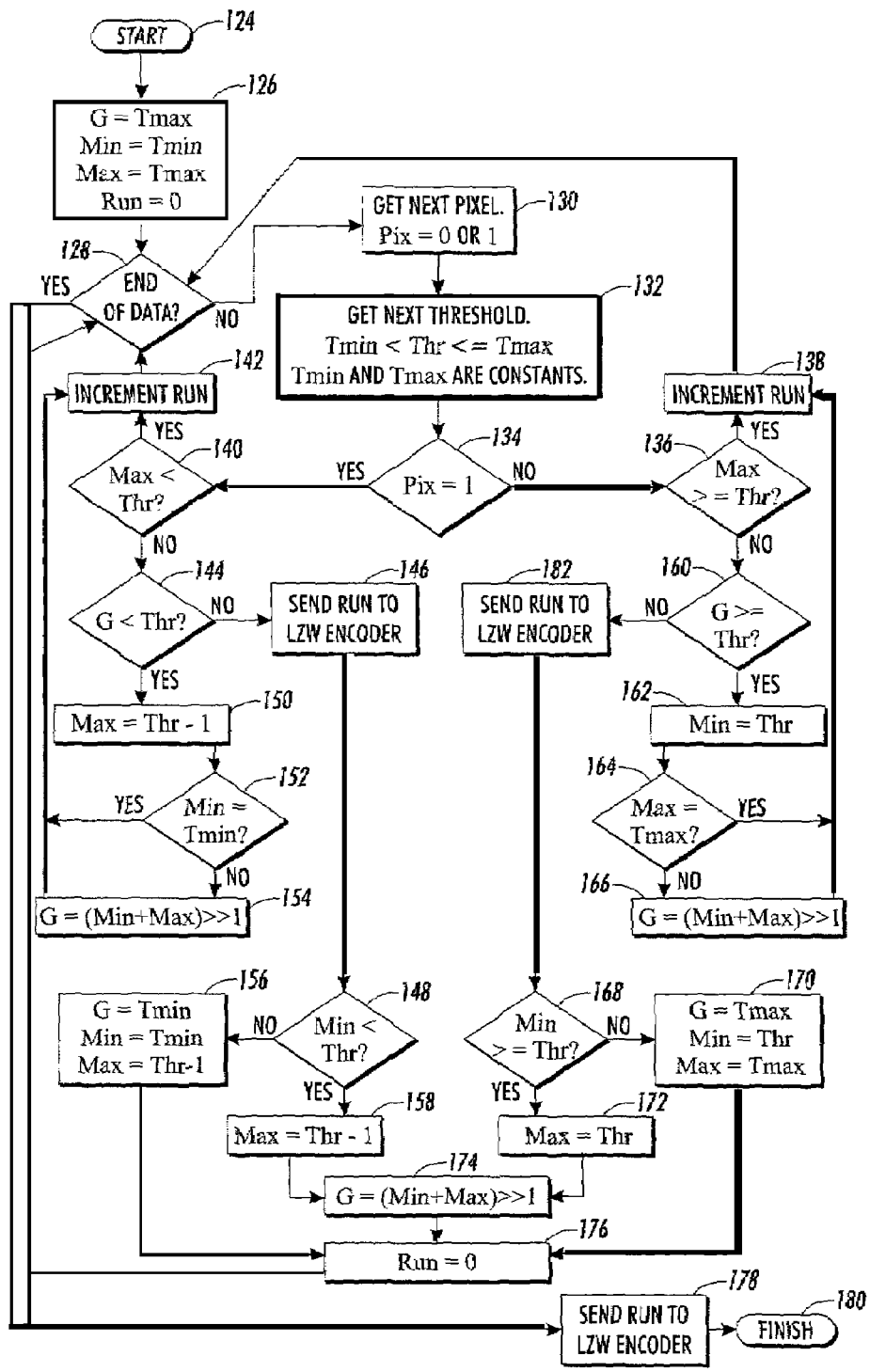
FIG. 13 is a flowchart showing the steps for the preprocess algorithm in accordance with the present invention.

Turning now to FIG. 13, there is shown a flow chart for the optimized preprocess algorithm. It combines the key generation, single key encryption and run length encoding into a single process. The encoding process begins at step 124 wherein four integer variables are initialized in step 126. The variable min represents the minimum value of G. Let min=Tmin, where Tmin is a constant. The variable max represents the maximum value of G. Let max=Tmax, where Tmax is a constant. The variable G represents an approximate image value for the run length. Let G=Tmax, where Tmax is a constant. The variable run represents the runlength wherein run=0. In a typical 8 bit system Tmin=0, and Tmax=255. In a typical 12 bit system Tmin=0, and Tmax=4095. In a typical 16 bit system Tmin=0, and Tmax=65535.

Referring now to FIG. 13, step 128 begins the main loop of the preprocess compression algorithm. Once all the data has been processed, the loop terminates. If all the data has not been processed, in step 130 the next pixel value is retrieved from the bitmap. The pixel value is assigned to the variable named pix. The value of pix will always be a zero or a one. Next in step 132 the threshold value is retrieved out of the threshold matrix. The threshold array T is a two dimensional matrix of values that is indexed according to the current pixel position. If (x, y) is the current pixel position in the bitmap, then the threshold value for the current pixel is Thr=M[x modulo Nx, y modulo Ny], where Nx is the width of the threshold matrix M and Ny is the height of the threshold matrix M. The pixel is then checked to see if it is a one or a zero in step 134.

Figure 14:
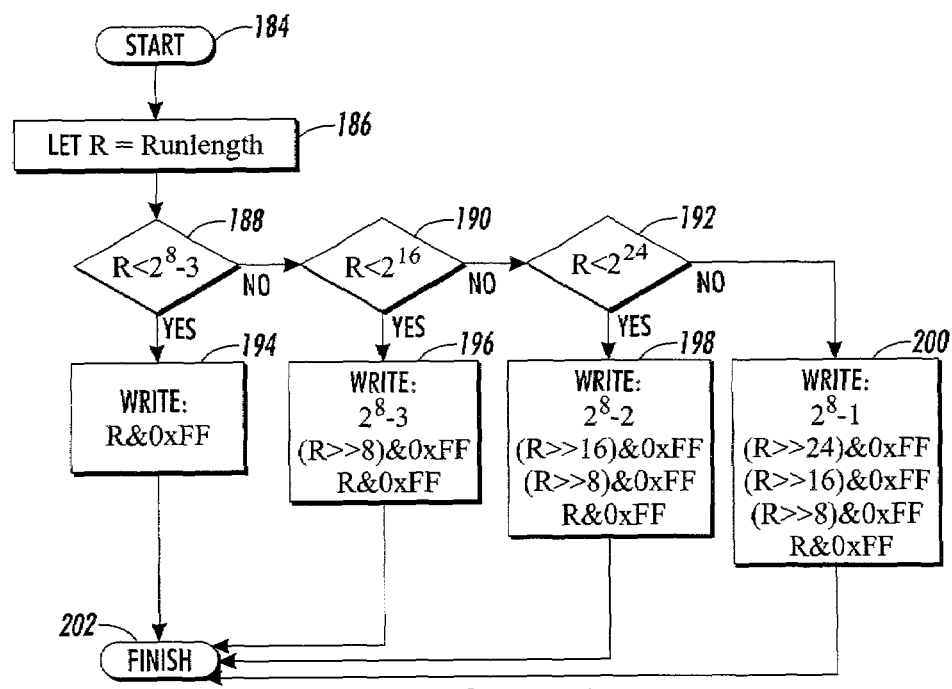
FIG. 14 is a flowchart showing the steps used to convert 32 bit unsigned values into a series of 8 bit unsigned values.

If the test in step 134 is false, processing continues with step 136, which is another logical test, is Max>=Thr? If the test in step 134 is true, processing continues with step 140, which is another logical comparison test: is Max<Thr? If either comparison in steps 140 or 136 have a positive result processing continues with step 142 or step 138. Steps 142 and 138 are equivalent, they both cause the runlength to be incremented, let run=run+1. If the test in step 140 has a negative result, then the algorithm continues with step 144 which is yet another logical comparison test, is G<Thr? If the result of this comparison is true, then the algorithm proceeds to step 150 which modifies the value of the variable Max, let Max=Thr−1. Next comes step 152 which is a logical comparison between the variables Min and Tmin, more specifically is Min=Tmin? If the result is true, a runlength of ones is being compressed and processing continues with step 142, otherwise the algorithm continues with step 154 and a new value of G is computed, let G=FLOOR(Min+Max). The function FLOOR(a) returns the largest integer value that is less than or equal to a. If the result of the test in step 144 is negative, then the runlength has ended and the values of the variable run is sent to the entropy encoder, this is step 146. The details of step 146, 182, and 178 are fully described in FIG. 14. Next is step 148, this is a logical comparison of is Min<Thr? If the result is negative, the values of G, min, and max are reset in step 156. This now assumes that a runlength of ones is beginning which sets G=Tmin, min=Tmin, max=Thr−1. If the result in step 148 is positive, the maximum value of G is then decreased in step 158 and max=Thr−1.

G is then compared to the threshold value in step 160 and in step 162 increase the minimum value of G and min=Thr. A test is then performed to see if a runlength of zeroes is being imaged in step 164. If it is, then the maximum value of G will still be equal to Tmax. The value of G is then adjusted by letting G=FLOOR((min+max)/2) in step 166. The maximum value of G is compared to the threshold value in step 168. In step 170 the values of G, min, and max are reset. This assumes that a runlength of zeroes is beginning. Let G=Tmax, min=Thr, max=Tmax and in steps 172 and 174 increase the minimum value of G and let min=Thr and adjust the value of G. Let G=FLOOR((min+max)/2). Next in step 176 reset the runlength to zero by letting run=0. Flush the last runlength to the entropy encoder as shown in step 178. This is the output of the encoding filter. The specifics of this step will vary depending on the entropy encoder being used. The only requirement asked of the entropy encoder is that it be capable of encoding integer values from 0 to $2^{32}-1$ inclusively. Processing is complete and the runlength has ended in step 180.

Entropy encoders accept data of varying widths. LZW for example processes data in unsigned 8 bit bytes. It is possible to send the LZW encoder 4 bytes for every runlength that it needs to encoded, but this would be extremely inefficient. By using the algorithm described in FIG. 14, small runlengths result in a single byte, while larger runlengths encode into more bytes. This is the preferable method to send runlength information to the LZW encoder. Reading runlengths from the LZW decoder is an inverse process of the algorithm described above. The first byte provides information about the range of R. If the value is less than 253, then the value is the runlength, otherwise subtract 251 from the value and read in that many bytes. As the bytes are read, they are shifted and bitwise ORed into the R register.

Turning once again to FIG. 14 the conversion process starts at step 184 wherein R is set to be the runlength in step 186. This is the 32 bit input value. Next a test is performed to see if the runlength is less than $2^8-3$ in step 188. If it is it is not, then tested to see if the runlength is less than $2^{16}$ in step 190. If it is it is net, then tested to see if the runlength is less than $2^{24}$ in step 192. If it is less than in step 188 than the output of the runlength R as a single 8 bit value set in step 194. If it is less than in step 190 then the output is an 8-bit value of $2^8-3$ set in step 196. Followed by the value of R as a 16-bit value. The 16-bit value is output as two 8-bit values. The most significant byte is output first (big endian). If it is less than in step 192 then the output is an 8-bit value of $2^8-2$ set in step 198. Followed by the value of R as a 24-bit value. The 24-bit value is output as three 8-bit values. The bytes are output from most significant to least significant (big endian). If R is greater than or equal to $2^{24}$ in step 192 then the output is an 8 bit value of $2^8-1$ set in step 200 and followed by the value of R as a 32 bit value. The 32-bit value is output as four 8-bit values. The bytes are output from most significant to least significant (big endian). The runlength has been successfully converted into a sequence of 8 bit values in step 202.

Figure 8:
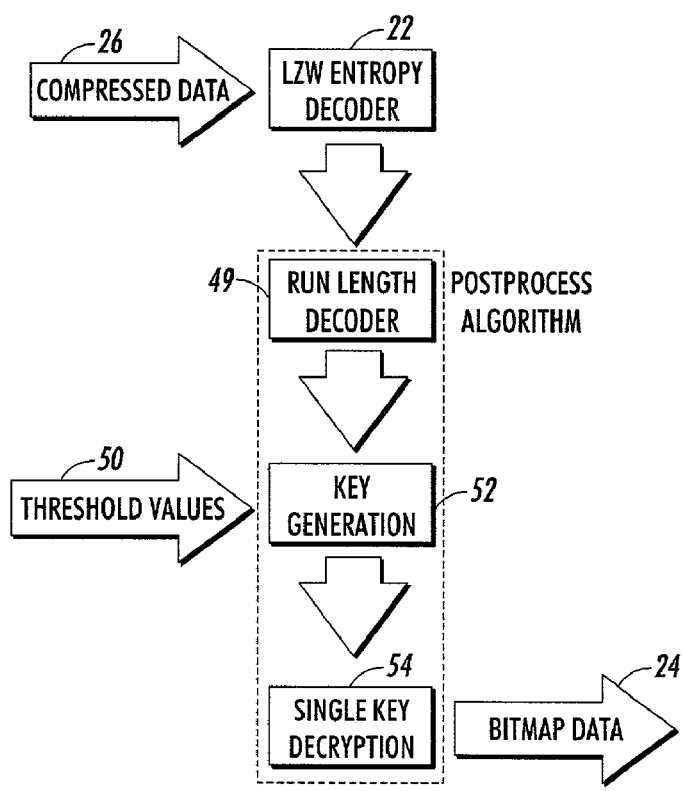
FIG. 8 is a block diagram illustrating data flow for halftone encryption data decompression.

The decompression is the inverse of the compression pipeline. It essentially uses the same modules as the compression algorithm albeit in a different order. The runlength decoder 49 must decipher the runlength values stored in the format described in FIG. 14. As with the preprocess algorithm, the individual steps in the postprocess algorithm can be combined into a single optimized process. The boundaries between the modules shown in FIG. 8 become lost within this optimized algorithm, but the functionality remains the same.

Figure 16:
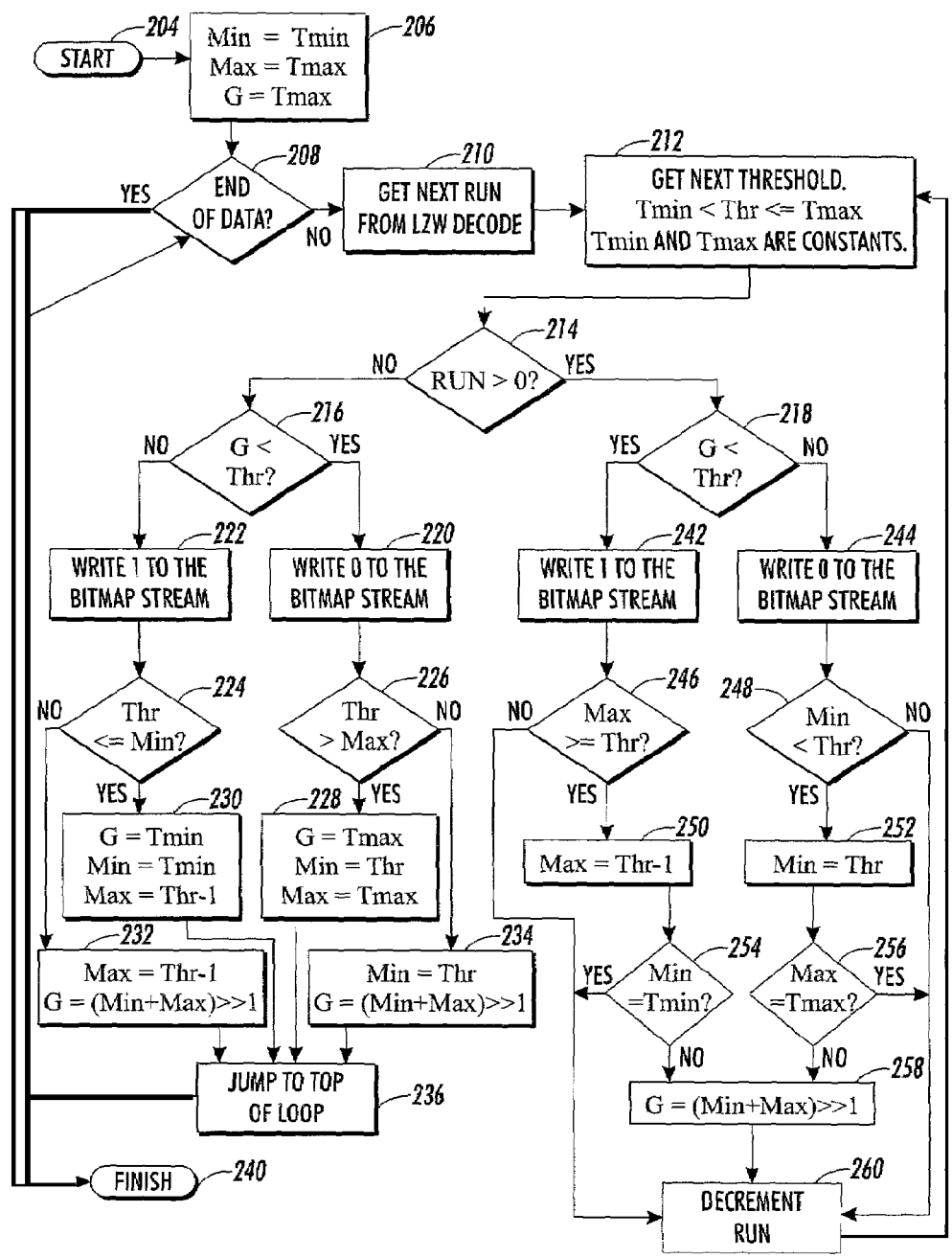
FIG. 16 is a flowchart showing the steps for the postprocess algorithm in accordance with the present invention.

Referring to FIG. 16, the decompression algorithm for decompressing a band of the bitmap is described beginning at step 204. Initially, in step 206 values are set for three variables used in the algorithm of the present invention. All three of these variables are integers. The variable Min represents the minimum value of G. Let Min=Tmin, where Tmin is a constant. The variable Max represents the maximum value of G. Let Max=Tmax, where Tmax is a constant. The variable G represents an approximate image value of the runlength. Let G=Tmax. In a typical 8 bit system Tmin=1, and Tmax=255. In a typical 12 bit system Tmin=1, and Tmax=4096.

After setting the initial values the algorithm either begins or ends in step 208. Once all the data has been processed, the loop terminates at step 240. To decompress the data, the algorithm proceeds to step 210 wherein the next runlength from the entropy decoder is retrieved. This is the input into the decoding filter. The specifics of this step will vary depending on the type of entropy encoder being used. The only requirement asked of the entropy decoder is that it be capable of decoding integer values from 0 to $2^{32}-1$ inclusively. The value of the runlength is assigned to the variable run. Next, in step 212, the next threshold value out of the threshold matrix is retrieved. The threshold array T is a two dimensional matrix of values that is indexed according to the current pixel position. If (x, y) is the current pixel position in the bitmap, then the threshold value for the current pixel is T[x modulo Nx, y modulo Ny], there Nx is the width of the threshold matrix and Ny is the height of the threshold matrix.

The decompression algorithm then continues to the conditional step 214 to see if this is the last pixel in the runlength. If it is, the test is to see if the threshold value is greater than G in step 218. If G is less than the threshold value a 1 is written into the bitmap as shown in step 242. The threshold value is then compared to the maximum value of G in step 246. If the maximum value is less than the threshold value, the process goes to step 260, which will be described later. If the maximum value is greater than the threshold value, in step 250 the maximum value of G is decreased by max=Thr−1. Next, in step 254, a test is performed to see if a runlength of ones is being processed. If no zeroes have been output to the bitmap, the minimum value of G will still be equal to Tmin and the algorithm proceeds to step 258, if not to step 260.

However, If the threshold value is less than G in step 218 the algorithm proceeds to step 244 wherein a 0 is written into the bitmap stream. Next, the threshold value is compared to the minimum value of G in step 248. If the minimum value is greater than the threshold value, the process goes to step 260, which will be described later. If the minimum value is less than the threshold value, in step 252 the maximum value of G is set to max=Thr. Next, in step 256, a test is performed to see if a runlength of zeros is being processed. If no ones were output to the bitmap, the maximum value of G will still be equal to Tmax and the algorithm proceeds to step 258, if not to step 260. Lastly, at the end of both conditional branches in 218, the value of G is adjusted such that G=FLOOR((min+max)/2). Lastly, in step 260 the runlength value is decremented, because a pixel value has been output to the bitmap wherein run=run-1 and the branch completes at 212 and the process starts again as described above.

Referring to FIG. 16, if the conditional step 214 is the last pixel in the runlength the test is to see if the threshold value is less than G in step 216. If G is less than the threshold value a 1 is written into the bitmap stream as shown in step 222. The threshold value is then compared to the minimum value of G in step 224. If the minimum value is less than the threshold value, then in step 230, reset the values of G, min, and max. Assumes that a run of ones is beginning. Let G=Tmin, min=Tmin, and max=Thr-1 then go to step 236 and jump back to the top of the main loop. If the minimum value is greater than the threshold value, then in step 232, decrease the maximum value of G, and adjust G accordingly. Let max=Thr-1, and G=FLOOR((min+max)/2) then go to step 236 and jump back to the top of the main loop.

However, if G is greater than the threshold value a 0 is written into the bitmap stream as shown in step 220. The threshold value is then compared to the maximum value of G in step 226. If the maximum value is less than the threshold value, then in step 228, reset the values of G, min, and max. Assumes that a run of zeros is beginning. Let G=Tmax, min=Thr, and max=Tmax then go to step 236 and jump back to the top of the main loop. If the maximum value is greater than the threshold value, then in step 234, increase the minimum value of G, and adjust G accordingly. Let min=Thr, and G=FLOOR((min+max)/2) and jump back to the top of the main loop.

Therefore, halftone encryption provides a mechanism that performs better than standard compression schemes. Standard compression schemes simply remove entropy from the bitmap. Halftone encryption uses information about how the bitmap was generated to aid it in the entropy removal process. This algorithm has many advantage over other methods. Other schemes attempt to compress the original image data and halftone during decompression. The original data may and most likely will contain a high amount of entropy. Consequently it will not compress well. Even if an equivalent data set with a lower entropy is used, it will not compress as well as the halftone encryption algorithm. The mere act of selecting a single data set to compress specifies too much information. Much of that information is redundant. The halftone encryption algorithm of the present invention works with sets of equivalent data, never specifying more information than is necessary.

While the invention has been described above with reference to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A method for threshold encoding of frame buffers using a threshold matrix to generate a key bitstream, comprising steps of:
    processing bitmap data;
    generating the key bitstream utilizing the threshold matrix such that the key bitstream never has to be stored; and
    using the key bitstream, applying single key encryption and run length encoding on the bitmap data for losselessly removing entropy from a data stream for compressing the bitmap data.

2. The method for threshold encoding according to claim 1, wherein the generated key is similar to the bitmap data.

3. The method for threshold encoding according to claim 2, further comprising a step of thresholding a predictor value.

4. The method for threshold encoding according to claim 3, further comprising a step of searching the bitmap for equivalent image sets that produce the same bitmaps.

5. The method for threshold encoding according to claim 4, wherein the equivalent image sets comprise of runlength of constant image values and actual runlength.

6. The method for threshold encoding according to claim 5, wherein the runlengths are of solid fill provided until a hint change.

7. The method for threshold encoding according to claim 6, further comprising a step of compressing the bitmap data by XORing a minimal number of hints required to find an equivalent image value for the runlength.

8. The method for threshold encoding according to claim 7, further comprising a step of decompressing the bitmap data by distinguishing if a single bit represents an image value adjustment hint.

9. The method for threshold encoding according to claim 7, further comprising a step of decompressing the bitmap data by distinguishing if a single bit represents the end of a runlength.

10. The method for threshold encoding according to claim 9, wherein the image values for the runlengths that are never explicitly encoded.

11. A method for threshold encoding of frame buffers using a threshold matrix to generate a key bitstream, comprising the steps of:
    processing bitmap data;
    generating the key bitstream utilizing the threshold matrix such that the key bitstream never has to be stored; and
    using the key bitstream, applying single key encryption and run length encoding on said bitmap data for losselessly removing entropy from a data stream for compressing said bitmap data wherein image values for the runlengths that are never explicitly encoded.

12. The method for threshold encoding according to claim 11, further comprising a step of generating a key bitstream by thresholding.

13. The method for threshold encoding according to claim 12, wherein the generated key is similar to the bitmap data.

14. The method for threshold encoding according to claim 13, further comprising a step of searching the bitmap for equivalent image sets that produce the same bitmaps.

15. The method for threshold encoding according to claim 14, wherein the equivalent image sets comprise runlength of constant image values and actual runlength.

16. The method for threshold encoding according to claim 15, wherein the image values for the runlengths are never explicitly encoded.

17. The method for threshold encoding according to claim 16, further comprising a step of compression compressing the bitmap data by XORing a minimal number of hints required to find an equivalent image value for the runlength.

18. The method for threshold encoding according to claim 17, further comprising a step of decompressing the bitmap data by distinguishing if a single bit represents an image value adjustment hint.

19. The method for threshold encoding according to claim 17, further comprising a step of decompressing the bitmap data by distinguishing if a single bit represents the end of a runlength.

20. A method for threshold encoding of frame buffers using a threshold matrix to generate a key bitstream, comprising the steps of:
  processing bitmap data;
  generating the key bitstream utilizing the threshold matrix such that the key bitstream never has to be stored; and
  using the key bitstream, applying single key encryption and run length encoding on said bitmap data for losslessly removing entropy from a data stream for compressing said bitmap data wherein image values for the runlengths are never explicitly encoded and decompressing the bitmap data by distinguishing if a single bit represents an image value adjustment hint or if a single bit represents the end of a runlength.

21. The method for threshold encoding according to claim 1, further comprising determining the threshold matrix by comparing an image value of the bitmap data with a threshold value.

22. The method for threshold encoding according to claim 11, further comprising determining the threshold matrix by comparing an image value of the bitmap data with a threshold value.

23. The method for threshold encoding according to claim 20, further comprising determining the threshold matrix by comparing an image value of the bitmap data with a threshold value.

* * * * *